Aug. 16, 1966    J. S. BAKER ETAL    3,266,905
PROCESS FOR IMPROVING THE FLAVOR STABILITY OF PEANUT BUTTER
Filed June 11, 1965    2 Sheets-Sheet 1
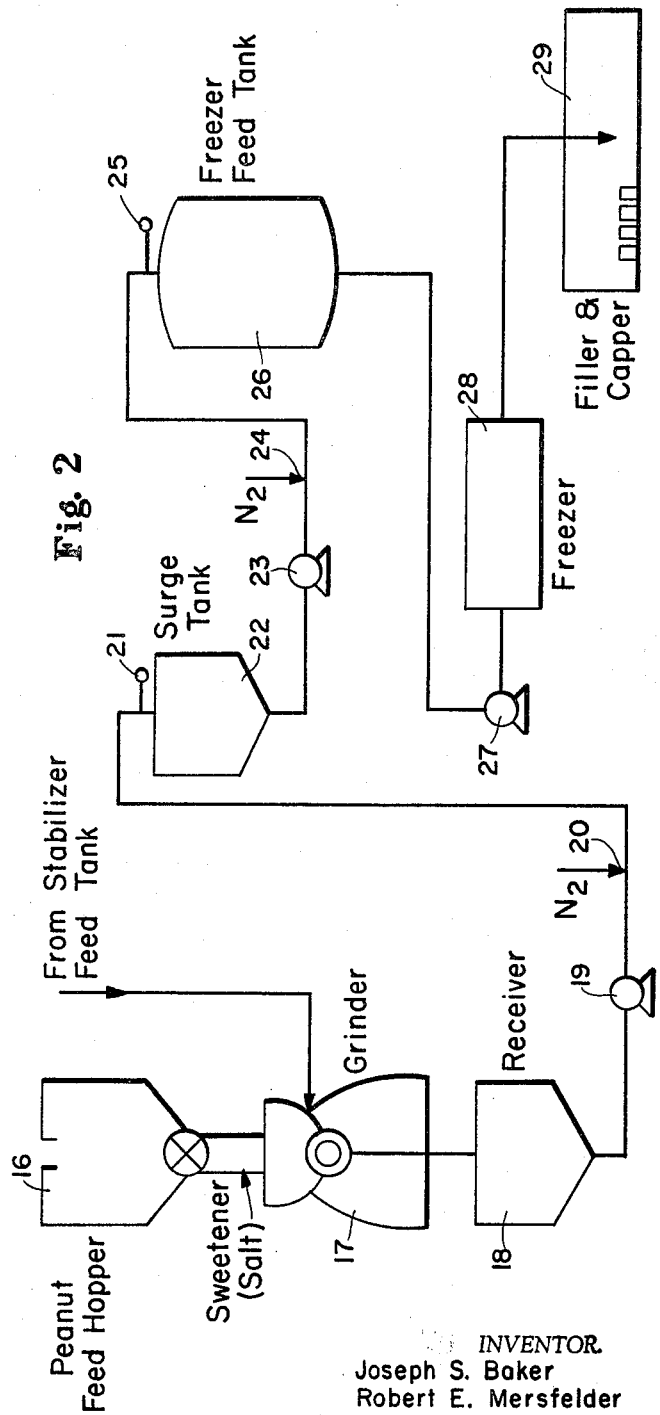
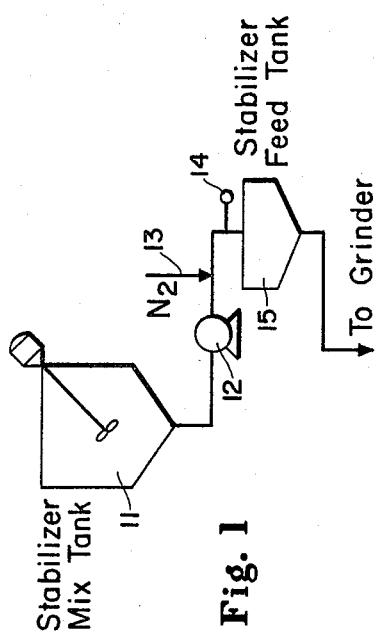
INVENTOR.
Joseph S. Baker
Robert E. Mersfelder
Robert L. Wille
By Thomas J. Flaherty
ATTORNEY

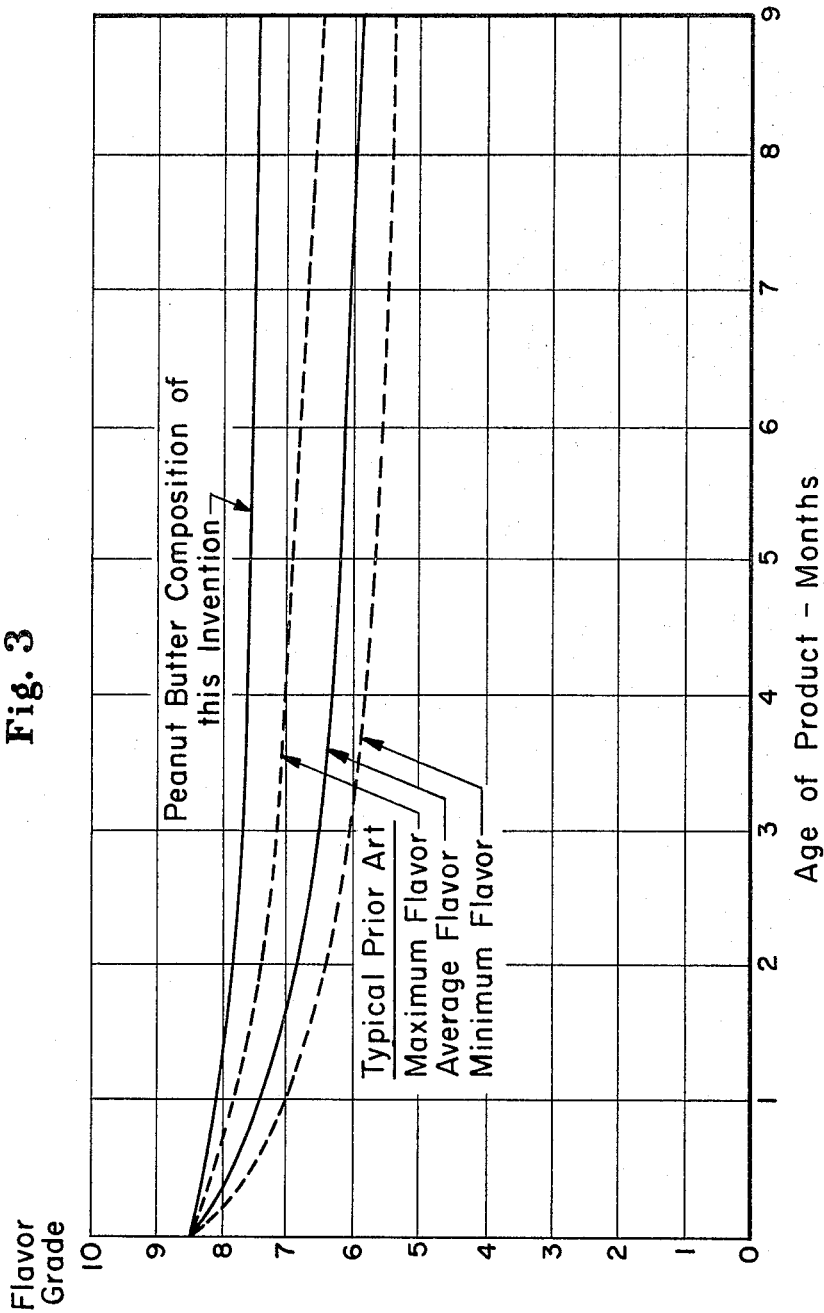

3,266,905
PROCESS FOR IMPROVING THE FLAVOR STABILITY OF PEANUT BUTTER

Joseph S. Baker, Green Township, Hamilton County, Robert E. Mersfelder, Springfield Township, Hamilton County, and Robert L. Wille, Cincinnati, Ohio, assignors to The Procter & Gamble Company, Cincinnati, Ohio, a corporation of Ohio
Filed June 11, 1965, Ser. No. 463,318
6 Claims. (Cl. 99—128)

This application is a continuation-in-part of copending application Serial No. 255,302, filed January 31, 1963.

The invention described and claimed in this application relates to a process for improving the flavor stability of peanut butter by removing dissolved, adsorbed and entrained oxygen from peanut butter and peanut butter stabilizer slurries, and with peanut butter compositions made by the process of this invention having a specific dissolved, adsorbed, entrained and accessible oxygen content. As used herein the term "accessible oxygen" means that oxygen which is present in the outage (headspace) of the container of peanut butter.

The destructive action of atmospheric oxygen on many types of perishable food products has long been known and studied. Various types of improved processing and packaging techniques have been developed to avoid or minimize the harmful effects of exposure to atmospheric oxygen. Of course, all of these various types of processing and packaging techniques are not suitable for every type of food product. The physical and chemical characteristics as well as the essential processing of the various food products will have a material bearing upon the ultimate effectiveness of the particular technique used for avoiding or minimizing the destructive effects of oxygen.

An obvious method of retarding oxidative deterioration of food products during storage is to completely envelope the food product with a packaging material such as a metal can or glass container which is impervious to air. During such packaging care must be taken to avoid incorporating atmospheric oxygen into the canned or bottled product. With particular respect to peanut butter products, U.S. Patent 2,521,243, granted to Mitchell September 5, 1950, at column 14, lines 3 to 24, notes the importance of avoiding undue incorporation of oxygen in the product to avoid rancidity and off-flavors.

Packaging a food product in a material which is impervious to air and eliminating undue incorporation of air into the product and the container during packaging are not completely effective methods for protecting certain food products which contain entrapped air. Air can unavoidably and unintentionally become entrapped in certain food products by essential processing treatments and/or by the use of certain desirable additives.

One method which has been suggested for retarding oxidative deterioration of perishable food products which are packaged in metal or glass containers is to first remove the air from the container and the food product and then displace the air with an inert gas such as nitrogen. Rector, U.S. Patent 1,649,127, granted November 27, 1927, is an early disclosure of such a method for canning various types of food products.

Rector teaches that oxygen dissolved and occluded in the food product or in the accompany liquid, or contained in the space between the top of the container and the surface of the contents (headspace) is a principal source of oxidative deterioration. Rector devotes his attention to two classes of food products which he states have not been well-adapted to previous gas-canning methods. These two classes of food products are (1) Liquid or pasty products, such as edible oils, condensed milk, etc., and
(2) Products which are partly solid but surrounded by liquid, as for instance, fruits and vegetables put in syrup, brine, or other liquid.

For canning the above two classes of food products, Rector briefly describes several methods of displacing the oxygen content of both the container and the food product. They are (1) By heating, with or without agitation,
(2) By creating a vacuum,
(3) By displacing the air with inert gas, or
(4) By a combination of these methods.

More recent and more detailed teachings on the use of inert gases, such as nitrogen, for the protection of the quality of perishable foods by gas-canning are described by Walker, 21 Food Industries, 1189, 1190, 1342 and 1344, September 1949, and Bayes, 4 Food Technology, 151 to 157, April 1950. These articles describe, inter alia, three basic methods by which food products in general can be protected from the destructive effects of air or oxygen. As in Rector, these methods eliminate oxygen by (1) Heating,
(2) Vacuum de-aeration, and
(3) Displacement of air by inert gas purging or stripping.

Although the above methods of gas-canning with inert gases are useful for protecting the quality of many perishable foods, they are insufficient to fully protect the flavor characteristics of freshly made peanut butter for extended storage periods. Such gas-canning methods are effective for protecting the quality of certain liquid or pasty foods such as edible oils and condensed milk; however, these food products have essentially a single liquid phase. The above methods are also effective for use with foods which are partly solid but surrounded by liquid such as fruits and vegetables put in syrup, brine, or other liquid. These products have essentially a liquid phase surrounding relatively large pieces or chunks of solid phase porous fruits and vegetables. The above methods also are suitable for liquid or pasty food products, such as purees, wherein the relatively large pieces of soft solid phase fruits and vegetables have been comminuted, or for soft pasty food products such as mayonnaise, whipped toppings, and plastic shortenings. However, none of the above classes of food products have the particular characteristics of peanut butter which contribute to the ineffectiveness of the above methods of gas-canning with inert gas for retaining flavor stability in the peanut butter.

As is well known, peanut butter is prepared by grinding or otherwise comminuting peanuts to a very fine particle size to form a homogeneous mass. This mass consists of a myriad of small solid particles suspended in an oily medium. Including the dissolved, adsorbed, and entrained oxygen, peanut butter is essentially a three phase system of solid, liquid, and gas. Although the final peanut butter product is homogeneous and spreadable, it has a consistency much different from that of a spreadable product such as mayonnaise or butter and completely different from that of a liquid or pasty product such as edible oil or condensed milk. It is believed that this myriad of small solid particles in peanut butter adsorbs oxygen on the solid peanut surfaces in a manner such that ordinary inert gas-canning methods do not effectively remove the adsorbed oxygen. It is believed that this adsorbed oxygen which is not removed as readily as the dissolved and entrained (or occluded) oxygen, tends to react with the protein in the solid peanut particles and, thereby, contributes to the formation of undesirable flavors during extended storage periods.

Accordingly, it is an object of this invention to provide a process for improving the flavor stability of peanut butter by removing dissolved, adsorbed, and entrained oxygen therefrom.

It is another object of this invention to provide a process for removing dissolved, adsorbed, and entrained oxygen from peanut butter stabilizer slurries used in the manufacture of peanut butter.

It is a further object of this invention to provide a peanut butter composition having improved flavor stability from which essentially all of the dissolved, adsorbed, and entrained oxygen has been removed.

It is a still further object of this invention to provide a peanut butter composition containing no more than 0.5 volume percent of dissolved, adsorbed, entrained, and accessible oxygen as measured within about 15 minutes of packing.

It has unexpectedly been found that the flavor stability of peanut butter can be substantially improved by a new and improved method of inert gas treatment whereby inert gas is injected into peanut butter and peanut butter stabilizer slurries at a rate ranging from about six to about 30 volume percent (as measured at standard temperature and pressure—S.T.P.) of the rate the slurry is being pumped in the process system at the point of injection and while said slurry is maintained in a process system under a positive pressure of at least about three atmospheres and preferably from about five to about seven atmospheres. The inert gas must then be retained in the process system in these amounts and under these pressures for a period of time to substantially dissolve in the slurry. In other words, the inert gas does not merely pass through the slurry but must substantially dissolve therein.

The slurry is then flashed to substantially atmospheric pressure and an oxygen-inert gas mixture is thereby released from solution and then removed from the system. The injection and flashing steps must be carried out a plurality of times with the peanut butter slurry before further processing of the peanut butter, irrespective of whether or not the peanut butter stabilizer slurry is first de-oxygenated, such that the peanut butter contains not more than about 0.5 volume percent of dissolved, adsorbed and entrained oxygen as hereinafter set forth. The further processing comprises rapidly chilling the peanut butter slurry to a temperature less than about 100° F. to substantially crystallize the glyceride solids of the slurry and then packing the peanut butter in final containers with conventional inert gas-canning methods such as used in the canning industry. This gas canning is accomplished by blanketing or charging the peanut butter and container with an inert gas or by use of a vacuum. All adventitious oxygen or air is swept away from the headspace in the container during this final gas-canning step such that the peanut butter contains not more than about 0.5 volume percent of dissolved, adsorbed, entrained, and accessible oxygen.

In the manufacture of peanut butter, peanut butter stabilizers are ordinarily used to prevent the oil in peanut butter from separating from the remainder of the peanut constituents after the peanut butter has been packed. These agents work by forming, on cooling, a network of interlacing crystals in the peanut butter which effectively precludes migration of the peanut and other solid particles from the oil phase and thus prevents separation of the peanut butter into two distinct layers. Stabilizers are used in place of, or in conjunction with, peanut oil released during the grinding of peanuts.

The stabilizing agents generally consist of substantially completely saturated triglyceride fats (hardstock), such as hydrogenated peanut oil and hydrogenated cottonseed oil, which are solid at normal temperatures. Other fats, such as hydrogenated or partially hydrogenated soybean oil, corn oil, lard and tallow, as well as the monoglycerides, diglycerides, and polyglycerol esters of these fats and mixtures of the above, also have been used. The solid fat stabilizing agents are added to peanut butter in liquid, powder or flake form at the peanut grinding stage as more fully explained hereinafter; or alternatively they are suspended in an edible oil vehicle to form a peanut butter slurry consisting of liquid edible oil and fat particles which at normal temperatures are solid, the stabilizer slurry usually being added to the composition at the peanut grinding stage. Salt is often added to the stabilizer slurry so that it can be metered into the peanut butter at the same time as the hardstock; however, this is not essential. For example, any of the naturally occurring liquid glyceride oils as for instance cottonseed oil, peanut oil, linseed oil, sunflower seed oil, corn oil, olive oil, rapeseed oil, fish oil and the like, mixtures thereof or normally liquid fractions obtained from these or other glyceride oils, or normally liquid fatty acid esters such as sperm oil, methyl oleate, benzyl laurate, ethyl laurate, and diethylene glycol monolaurate can be employed as the liquid constituent of the slurry. In general, the liquid constituent may be any normally liquid oleaginous ester of a mono- or polyhydric alcohol and a saturated or unsaturated fatty acid containing at least eight and preferably at least 12 carbon atoms in the molecule.

The quantity of salt and hardstock which is suspended in the edible oil vehicle to form the peanut butter stabilizer slurry may vary widely. Generally, however, the undissolved portion (salt and/or hardstock) does not total over about 65 percent by weight of the stabilizer slurry. One example of a stabilizer slurry to be used in this invention consists of a 1:1:1 ratio by weight, respectively, of liquid peanut oil (iodine value about 90), vegetable hardstock (iodine value about 8), and finely dvided salt (sodium chloride finer than about 60 mesh). Other examples of peanut butter stabilizer slurries which can be used in this invention include those described in U.S. Patents 2,521,242 and 2,521,243, granted to Mitchell September 5, 1950; and U.S. Patent 2,521,219, granted to Holman and Quimby September 5, 1950.

Unless specially processed to cause preferential phase crystallization of the hardstock such as is described in U.S. Patents 2,521,242, 2,521,243, and 2,521,219, mentioned above, a peanut butter stabilizer slurry containing a substantial portion of hardstock stabilizing agent will crystallize or set and become unpumpable at temperatures below about 130° F. Since, in order to practice the oxygen removal process described herein, the stabilizer slurry must be pumpable, it follows that in some instances the stabilizer slurry will have to be heated to a temperature above about 130° F. where the hardstock portion is melted before it can be subjected to the oxygen removal process of this invention. If the stabilizer slurry consists of an edible oil vehicle in which hardstock and salt is suspended, for example, then by melting the hardstock before subjecting the slurry to the process of this invention the only remaining undissolved porton is the salt. If the slurry consists only of hardstock suspended in an edible oil vehicle, then by melting the hardstock before subjecting the slurry to the process of this invention, there is no undissolved material in the composition being treated.

Where a peanut butter mass is to be treated, as distinguished from a stabilizer slurry, above, it is contemplated that the peanut butter mass will be comprised of approximately 90 percent by weight of ground up peanuts (a substantial quantity of which is oil contained in unbroken cells in the peanut particles), about three percent by weight sweetener such as sucrose, dextrose or honey, up to about four percent by weight of a hardstock stabilizing agent from the stabilizer slurry or elsewhere, and minor proportions of salt and peanut oil or other edible oil. The above ingredients or quantities of ingredients are representative and can be varied as desired.

The term "peanut butter" as used herein is meant also to encompass what are generally known as peanut spreads. Peanut butter spreads contain only about 75 percent ground up peanut particles, the difference between the peanut particle content of normal peanut butter and that of the peanut spread being made up by adding additional vegetable oil or partially hydrogenated vegetable oil.

It is essential that peanut butter containing from about two percent or more by weight hardstock as a stabilizing agent be processed at temperatures above about 130° F. since below that temperature the peanut butter becomes viscous and hard to pump due to the crystallization of the hardstock. It is preferred for the purposes of the oxygen removal process described herein that the processing of peanut butter be carried out at temperatures ranging from about 130° F. to about 180° F. At these temperatures peanut butter is fluid and pumpable and can be considered a slurry of edible oil (melted hardstock, vegetable oil, etc.) and up to about 65 percent by weight of the slurry of undissolved material (peanut particles, salt and sugar). That oil which is bound up in the peanut particles is not considered part of the undissolved portion, but rather is considered part of the edible oil portion. The terms "peanut butter" and "peanut butter slurry" are used synonymously herein when referring to peanut butter at temperatures above about 130° F.

Although the exact composition of the peanut butter stabilizer slurry or peanut butter mass to be treated by the process of this invention is not critical, it is essential that the oil content of the material being treated be in a fluid state and pumpable at the time of the injection of inert gas.

Oxygen can become dissolved, and/or adsorbed, and/or entrained in peanut butter stabilizer slurries and peanut butter in a number of different ways. For example, oxygen is normally present in entrained form in the solid salt and fat particles (hardstock) before they are admixed with the liquid edible oil vehicle to form a peanut butter stabilizer slurry; therefore, when these components are admixed with the vehicle, some of the oxygen is dissolved in the liquid oil vehicle phase and some also is entrained in the slurry of oil and solid material thus formed. The liquid oil vehicle itself can be a source of oxygen since air is soluble in fats to the extent of about seven volume percent. In addition, when the liquid oil vehicle is agitated during the admixture of the salt and solid fat particles to assure a homogeneous suspension of solid material, air is drawn into the stabilizer slurry from the atmosphere; thus additional oxygen becomes dissolved and entrained therein.

Oxygen is ordinarily present in adsorbed and entrained form (and probably dissolved form as well) in blanched and roasted peanuts prior to grinding; thus, in the manufacture of peanut butter, when peanuts are ground to form a peanut butter mass, the oxygen present in the peanuts becomes dissolved, adsorbed, and entrained in the peanut butter mass. Solid sweeteners such as dextrose, or fructose also contain entrained oxygen; therefore, additional oxygen becomes dissolved, adsorbed, and entrained in the peanut butter during the mixing and agitation of the sweetener with the other components of the peanut butter mass. Oxygen can also become dissolved, adsorbed, and entrained in peanut butter by seeping into the apparatus and process lines through leaky pump glands and by entering the peanut butter during any agitating step.

By means of flavor stability tests it has now been determined that to eliminate staling, rancidity, and the development of off flavors on aging it is necessary that the total dissolved, adsorbed, entrained and accessible oxygen content of packaged peanut butter be no more than about 0.5 volume percent (as measured at standard temperature and pressure) of the peanut butter when measured within about 15 minutes after packing and preferably at the time of packing.

The process of this invention can be more readily understood by reference to the annexed drawings. FIGURES 1 and 2 are schematic diagrams which illustrate the steps required in the process of this invention as well as preferred forms of apparatus which can be used in the practice of this invention, FIGURE 1 illustrating the processing steps and apparatus which can be used to deoxygenate a peanut butter stabilizer slurry and FIGURE 2 illustrating the processing steps and apparatus which can be used to deoxygenate a peanut butter slurry. FIGURE 3 illustrates the relative flavor stability of the peanut butter compositions of this invention prepared according to the process of this invention as compared to typical peanut butter compositions of the prior art which have not been subjected to the process of this invention.

The process as described hereinafter is not to be considered as limiting the scope of the invention; however, in order to aid in the description of the process certain limits are mentioned which are preferred limits in the practice of this invention. Referring now to FIGURE 1, a peanut butter stabilizer slurry of a type hereinbefore described is prepared in a stabilizer mix tank 11 and heated till the hardstock portion is melted. The heated stabilizer slurry is then pumped by pump 12 through the lines into a stabilizer feed tank 15, which is at atmospheric pressure. While the stabilizer slurry is being pumped from tank 11 to tank 15, inert gas is injected into the slurry at point 13 at a rate ranging at least from about six to about 30 volume percent of the rate at which the stabilizer slurry is being pumped, while the stabilizer slurry at the point of injection is under a pressure of at least about three atmospheres, and preferably about five to about seven atmospheres (about 60 to about 90 p.s.i.g.), from the setting of the back pressure valve 14. The inert gas is injected from a pressure source substantially greater than the pressure on the slurry so that the rate of gas flow can be metered accurately and so that the gas will be more finely dispersed in the slurry at the point of injection. The pressure differential can be varied over a wide range; however, the preferred differential is from about one to about three and one-third atmospheres with the most highly preferred differential being at least two atmospheres greater than the pressure on the slurry. The injection nozzle through which the gas is injected into the slurry should be constructed to insure that the gas is dispersed as finely as possible in order that it can dissolve in the material being treated at the maximum rate. The back pressure valve 14 is situated as close as possible to the inlet of tank 15 in order to allow the inert gas injected at point 13 the maximum time available to dissolve in the stabilizer slurry. The length of time required for the inert gas to dissolve to the maximum extent in the slurry is a function of many variables which include, inter alia, the system pressure on the slurry, the amount of gas being put in, the fineness of the dispersion of the gas at the point of mixing, and the temperature of the slurry. A method of determining if sufficient time has been allowed is to observe the bubble size of the escaping gas as the slurry is flashed. Large discrete bubbles indicate that sufficient time has not been allowed for the gas to dissolve; whereas, if the escaping gas is in small minute bubbles (i.e. the flashing is smooth), sufficient time has been allowed. Generally, a period of time of at least about three and one-half seconds is required; but substantially longer periods of time can be used, for example, up to several minutes. After the injection of the inert gas, the stabilizer slurry is flashed into the stabilizer feed tank 15 which is essentially at atmospheric pressure and which is blanketed by a stream of nitrogen flowing across the top of the tank. The oxygen-inert gas mixture released from solution in the stabilizer slurry, as a result of the decreased gas solubility brought about by the sudden release in pressure, bubbles out of the slurry and is then swept away in the stream of nitrogen flowing across the top of the slurry and out a vent in the tank.

Referring now to FIGURE 2, 16 is a peanut feed hopper where the blanched and roasted peanuts are stored prior to grinding. The peanuts are admixed with a sweetener at the point indicated on the chute from the feed hopper to the grinder and this mixture is transferred to the grinder 17. Salt can also be added to the peanuts at the same point as the sweetener, if desired. These particulate materials may be also swept with inert gas prior to grinding, if desired. In the grinder 17, the peanuts are finely ground and simultaneously admixed till homogeneous with the peanut butter stabilizer slurry, purged of its oxygen content, which is obtained from the stabilizer feed tank 15, thereby forming a peanut butter slurry. The peanut butter slurry is then transferred by gravity feed into a receiver 18. The temperature of the peanut butter slurry at this point is above about 130° F. Both the grinder 17 and the receiver 18 are blanketed with nitrogen. From receiver 18, the peanut butter slurry is pumped by pump 19 to a surge tank 22 which is at essentially atmospheric pressure. While the peanut butter slurry is being pumped, inert gas is injected into it at point 20 at a rate ranging from about six to about 30 volume percent of the rate at which the slurry is being pumped. The pressure on the slurry at the point of injection is maintained at least at about three atmospheres, and preferably about five to about seven atmospheres (about 60 to about 90 p.s.i.g.), by a back pressure valve 21 which maintains the pressure between pump 19 and back pressure valve 21 at the desired level. The inert gas is injected from a higher pressure source as indicated hereinbefore. The back pressure valve 21 is located as close as possible to the inlet into surge tank 22 in order that the inert gas injected at point 20 has the maximum time to dissolve in the peanut butter slurry. After the injection of inert gas at point 20, sufficient time is allowed for it to dissolve in the slurry and then the peanut butter slurry is flashed to atmospheric pressure in the surge tank 22. This tank is also blanketed by a stream of nitrogen flowing across the top. The oxygen-inert gas mixture released from solution in the peanut butter slurry, as a result of the decreased gas solubility brought about by the sudden release in pressure, bubbles out of the slurry and is swept away in the stream of nitrogen and out a vent in the tank. The peanut butter slurry is pumped from surge tank 22 by pump 23 to a freezer feed tank 26. The pressure inside the freezer feed tank 26 is essentially atmospheric and the tank is nitrogen blanketed in the manner previously described. At point 24, an inert gas is again injected into the peanut butter slurry at a rate ranging from about six to about 30 volume percent of the rate at which the peanut slurry is being pumped, and while the pressure on the slurry is maintained at least at about three atmospheres, and preferably about five to about seven atmospheres (about 60 to about 90 p.s.i.g.), at the point of injection by a back pressure valve 25. The inert gas is injected from a pressure source which is substantially greater than the pressure on the slurry, as has been mentioned hereinbefore. Again, the back pressure valve 25 is placed as close as possible to the inlet into the freezer feed tank 26 as possible in order that the inert gas injected at point 24 has the maximum time to dissolve in the peanut butter slurry. The maximum time is allowed for the inert gas to substantially dissolve, then as the slurry enters the freezer feed tank 26, it flashes to atmospheric pressure. The oxygen-inert gas mixture released from solution in the peanut butter slurry, due to the sudden release in pressure, bubbles out of the slurry and is drawn off in the nitrogen stream and out a vent. The peanut butter slurry is then pumped from the freezer feed tank 26 by pump 27 into a freezer 28. The freezer is of a type commonly known as a scraped wall heat exchanger (see, e.g., Bailey, Industrial Oil and Fat Products, Interscience Publishers, New York, pp. 1066 to 1068, third edition, 1964) which rapidly reduces the temperature of the peanut butter slurry to below about 100° F. (At all stages in the process from the grinding stage up to the time the peanut butter slurry enters the freezer, the temperature of the slurry has been at least about 130° F.) From the freezer 28, the chilled peanut butter mass passes into a conventional filler and capper apparatus 29 where the peanut butter is packed. The entire filling and capping operation is conducted under a nitrogen blanket.

The preferred inert gas for use in the process of this invention is nitrogen. Other inert gases which can be used to good advantage are argon, xenon, helium and under some circumstances carbon dioxide, or mixtures of gases such as are found in oxygen-free combustion products. A convenient and economical inert gas mixture for use in the aforedescribed process is flue gas obtained from an inert gas generator. An inert gas generator typically makes gas having the composition of approximately 88 percent nitrogen, a maximum of 12 percent carbon dioxide, a maximum of 0.5 percent combustibles ($C$, $H_2$, $CH_4$), and a maximum of 0.01 percent oxygen. As used herein, the term "inert gas" encompasses any gas which does not harm the flavor of peanut butter.

To obtain the maximum efficiency of the process disclosed herein, the pressure on the material being treated at the point of injection of the nitrogen or other inert gas should be substantially higher than atmospheric pressure in order that the greatest possible quantity of nitrogen or other inert gas can dissolve in the material, thereby assuring that more total gas (and thereby more oxygen) will be released when the material is flashed to atmospheric pressure. The pressure should not be so high, however, as to require special and expensive equipment, thereby making the process uneconomical.

In the normal peanut butter stabilizer slurry and peanut butter processing as described herein, it has been found that the pressure on the material at the point of injection of nitrogen must be at least about three atmospheres, and preferably is about five to about seven atmospheres. The material which has been injected can be flashed into a tank which is at atmospheric pressure or one that is under a vacuum with comparable results, thus the term "substantially atmospheric pressure" as used herein is meant to cover a pressure less than atmospheric.

The quantity of inert gas injected at any one injection site is also variable. Under the normal peanut butter and peanut butter stabilizer slurry processing conditions described herein, it is preferred to inject the inert gas at a rate of about six to about 30 volume percent (as measured at standard temperature and pressure—S.T.P.) of the rate of the material being processed. For example, if peanut butter is processed at a rate of about 80 cubic feet/hour, then inert gas should be injected at a rate of about five to about 24 cubic feet/hour. Gas may, of course, be injected at substantially higher rates, in which case only a portion will actually enter solution, and the remainder, in excess of saturation at the pressure in use, will of itself remove no oxygen from the peanut butter, but will simply pass to the receiving vessel and be released therein to assist the blanketing of that vessel.

One of the primary objects of the process described herein is to produce a peanut butter composition containing no more than about 0.5 percent by volume of the peanut butter of dissolved, adsorbed, entrained, and accessible oxygen as measured within about 15 minutes after packing in order to produce a product which is of substantially unchanged flavor after reasonably prolonged aging as encountered in normal marketing channels and in the home prior to use. The number of times the peanut butter slurry or peanut butter stabilizer slurry needs to be injected with inert gas in accordance with the oxygen removal process described herein to achieve this result depends on many variables, among them being the original oxygen content of the peanut butter and stabilizer slurry, the efficiency of the injection, solution, and release, the pressure on the material being treated at the point of injection, and the quantity of nitrogen being injected. Therefore, it cannot be stated with particularity how many injection sites there should be. It has been found, however, that under normal processing conditions using apparatus like that shown in FIGURE 2 where the inert gas is injected at the rate hereinbefore indicated as preferred, and the pressure on the peanut butter slurry is at least about three atmospheres, it takes at least three separate injections and subsequent flashing of the peanut butter slurry to achieve the desired oxygen content when the peanut butter is packed under a nitrogen or inert gas blanket.

Since a peanut butter stabilizer slurry may contribute as much as about 20 percent of the dissolved, adsorbed, and entrained oxygen in peanut butter, the desired end product can be achieved by subjecting the peanut butter stabilizer slurry to the oxygen removal process described herein, adding the stabilizer slurry to a ground peanut mass to form the peanut butter slurry and then injecting and flashing the peanut butter slurry two or more times. This is the preferred method of producing the composition of this invention.

The curves appearing in FIGURE 3 illustrate the relative flavor stability of the peanut butter composition of this invention containing no more than about 0.5 percent by volume as measured at S.T.P. of the peanut butter of dissolved, adsorbed, entrained and accessible oxygen when packed, as compared to a typical peanut butter composition of the prior art not subjected to the process of this invention. The compositions of both peanut butters were essentially the same as described in Example I, below. The peanut butter composition of this invention was subjected to the plurality of nitrogen injection and flashing steps in process using the nitrogen volumes and slurry pressures described in Example I. The peanut butter composition of the prior art was not injected with nitrogen using these volumes and pressures in process but, instead, were merely blanketed, charged, and purged with nitrogen at substantially atmospheric pressures. Both peanut butter compositions were packed in containers by conventional inert gas-canning methods with nitrogen.

The flavor stability of the peanut butter as given in FIGURE 3 was measured by a panel of five expert peanut butter tasters who tasted the peanut butter samples shortly after they were packed and at regular periodic intervals thereafter over a nine month period. Each sample remained sealed until the time of testing and all samples were stored in constant temperature rooms at temperatures of from 70° to 90° F. The tasters' judgments were recorded and averaged. In the graph, the two broken lines designated Maximum Flavor and Minimum Flavor refer, respectively, to the maximum and minimum limits of flavor stability which the typical prior art peanut butters exhibited, while the solid line designated Average Flavor refers to the average flavor stability of typical prior art peanut butters. The top solid line gives the flavor stability curve of the peanut butter compositions of this invention. On a flavor scale of 1–10, as represented by the ordinate of the graph in FIGURE 3, a peanut butter having a flavor grade of 7 or above is considered to have an excellent flavor. The flavor of fresh peanut butter is 8½. A value of 7 or above represents a strong fresh peanut flavor. A peanut butter having a grade of between 6 and 7 is considered to have a good flavor. The flavor of peanut butter in this range is that of moderate peanut flavor and slightly stale. A peanut butter having a flavor grade between 5 and 6 (weak peanut flavor and stale) is considered to have an undesirable flavor. A peanut butter having a flavor grade of below 5 (strong stale and slightly rancid flavor) is considered unacceptable to the consumer. By prior testing it has been determined that the flavor grade below which a difference from the flavor of fresh peanut butter can be detected by the consumer is 7 (the expert tasters are able to make much finer distinctions).

After nine months storage, the flavor of the peanut butter compositions of this invention cannot be distinguished from the flavor of fresh peanut butter by the consumer as the flavor grade was at all times above 7, whereas the flavor of typical prior art peanut butters not subjected to the deoxygenation process of this invent can be distinguished from that of fresh peanut butter, on the average, after about two months of aging. Thus it is seen from FIGURE 3 that the flavor stability of the peanut butter compositions of this invention is significantly improved over the flavor stability of typical prior art peanut butters.

Time is a critical factor in the measurement of the dissolved, absorbed, and entrained oxygen content of the finished product peanut butter since oxygen reacts very quickly with the peanut constituents in a manner such that, after about 15 minutes after packing, a significant portion of the oxygen contained in the fresh product becomes undetectable by the presently known methods of analysis. Therefore, in order to obtain a true and accurate reading of the dissolved, absorbed, and entrained oxygen content, it is essential that the measurement be taken within about 15 minutes after packing, and preferably at the time of packing.

A method of analysis which has been developed for analyzing the oxygen content of peanut butter is as follows: Heat-softened peanut butter (at about 150° F.) from the container of peanut butter to be analyzed is drawn into an evacuated (less than 2 mm. Hg) gas sample tube of about 250 ml. capacity. The sample size should be not greater than about 30 grams. The tube is immersed in hot water (150° F.) for about 15 minutes, and rotated to spread the sample in a thin film on the walls of the tube. After the tube has rapidly cooled to room temperature in a separate water bath, oxygen-free nitrogen is added to bring the pressure up to atmospheric pressure. Gas is removed from the tube for analysis by displacing it with 20 percent aqueous sodium sulfate solution and is collected. The gas is then analyzed for oxygen by any suitable chemical or instrumental technique wherefrom, with known sample size and system volume, the oxygen content of the peanut butter sample may be readily calculated. (A suitable apparatus is a Beckman Model E–2 Oxygen Analyzer.)

The invention described herein will be more fully understood from the following examples.

*Example I*

A peanut butter composition is prepared as follows: 949 lbs. of a peanut butter stabilizer slurry consisting of a 1:1:1 ratio of salt (60 mesh), a mixture of cottonseed and soybean hardstock having an iodine value of nine and peanut oil having an iodine value of 90 and containing 2.5 volume percent of dissolved and entrained oxygen is injected with nitrogen at a rate of 15 volume percent of the rate the stabilizer slurry is being pumped while the pressure on the stabilizer is seven atmospheres. The nitrogen is in contact with the slurry for 20 seconds. The stabilizer slurry is subsequently flashed to atmospheric pressure using the apparatus shown in FIGURE 1 which has been described herein. The temperature of the stabilizer slurry during the injection and flashing is 165° F. The dissolved and entrained oxygen content of the treated slurry is 0.316 volume percent. The stabilizer slurry is then added to the comminuted peanut mass and other ingredients making up the peanut butter slurry at the grinding stage and admixed therewith until homogeneous. The peanut butter stabilizer constitutes 7.3 percent by weight of the peanut butter slurry. The weight of the peanut butter slurry is 13,000 lbs. The other ingredients of the peanut butter slurry consist of, by weight, 90 percent peanut particles (a substantial proportion of which is peanut oil bound up in the unbroken oil cells of the peanut particles), and 2.7 percent sucrose. The peanut butter slurry formed by the addition of the peanut butter stabilizer in the grinder is then processed using the apparatus as illustrated in FIGURE 2. Prior to the first injection of nitrogen shown in FIGURE 2, the dissolved, adsorbed, and entrained oxygen content of the peanut butter slurry is about 2.0 volume percent. (Oxygen becomes dissolved, adsorbed, and entrained during the grinding of the peanuts and some leaks in through pump glands.) The peanut butter slurry is injected with nitrogen and subsequently flashd to atmospheric pressure twice in sequence using the apparatus shown in FIGURE 2. In both instances nitrogen is injected while the pressure on the slurry is six atmospheres and is injected at a rate of 25 volume percent of the rate the peanut butter slurry is being processed. The nitrogen is in contact with the slurry in both instances for at least six seconds. The oxygen content of the peanut butter slurry after the second injection and flashing operation is 0.148 volume percent. The peanut butter slurry is then passed through a freezer and rapidly chilled to less than 100° F. The chilled peanut butter is then gas-canned in glass containers under a nitrogen blanket containing less than one percent by volume of the outage of oxygen. All adventitious atmospheric oxygen is swept out from the headspace prior to final hermetic sealing of the container. The total dissolved, adsorbed, entrained and accessible oxygen content of the peanut butter when packed is less than 0.5 volume percent.

The peanut butter made by the process described above and containing less than 0.5 volume percent of dissolved, adsorbed, entrained and accessible oxygen has excellent flavor stability. After nine months aging, the flavor cannot be distinguished from the flavor of freshly made peanut butter by the average consumer.

*Example II*

In the above example, the peanut butter composition of this invention is made by first de-oxygenating the peanut butter stabilizer slurry, adding the slurry to a comminuted peanut mass to form a peanut butter slurry, and then twice subjecting the peanut butter slurry to the de-oxygenation process. The same results are achieved, without the necessity of de-oxygenating the peanut butter stabilizer slurry, by subjecting the peanut butter slurry to the de-oxygenation process described herein at least three times. In this example, the conditions of pressure on the slurry and quantity of nitrogen injected at each stage are the same as is stated in Example I.

*Example III*

In the above examples, the nitrogen used for injection can be replaced by argon, xenon, helium, carbon dioxide or flue gas, or mixtures thereof with results similar to the above results.

*Example IV*

A 4830 pound lot of peanut butter stabilizer slurry is formed by admixing in a stabilizer mix tank (as shown in FIGURE 1) salt (60 mesh), vegetable oil hardstock having an iodine value of eight, and unsaturated peanut oil having an iodine value of 90 in a 1:1:1 ratio by weight. The slurry is then heated in the tank to 150° F. At that temperature the hardstock melts; thus, the slurry then consists of a suspension of salt in peanut oil and melted saturated triglyceride fat. The stabilizer slurry is pumped from the stabilizer mix tank and flashed into the stabilizer feed tank using the apparatus illustrated in FIGURE 1. The dissolved and entrained oxygen content of the stabilizer slurry, as analyzed according to the method described herein, is 2.5 volume percent. Nitrogen is injected into the stabilizer slurry as it is being pumped from the stabilizer mix tank to a stabilizer feed tank illustrated in FIGURE 1 at the rate of 11 cubic feet per minute (at atmospheric pressure) and from a source at a pressure of nine atmospheres. The pressure on the slurry at the point of injection is seven and one-third atmospheres, and the slurry is pumped at the rate of 35,000 lbs. per hour. The nitrogen is in contact with the slurry for three and one-half seconds. After the injection of the nitrogen, the stabilizer slurry is flashed to amtospheric pressure in the stabilizer feed tank and the oxygen-nitrogen mixture of gas released is swept away in a stream of nitrogen forming a gas blanket. After treatment, the dissolved and entrained oxygen content is again measured and a value of 0.5 volume percent of oxygen in the slurry is recorded; thus the amount of dissolved and entrained oxygen removed by the aforedescribed process is 2.00 volume percent. This stabilizer slurry is then substituted for the stabilizer slurry of Example I and admixed with the comminuted peanut mass of Example I at the grinding stage. The peanut butter slurry is then subjected to the plurality of nitrogen injections and flashings as in Example I with similar results.

The total dissolved, adsorbed, entrained and accessible oxygen level of the peanut butter compositions of this invention when packed depend upon two factors. These factors are (1) the amount of dissolved, adsorbed, and entrained oxygen removed from the peanut butter by the oxygen removal process described herein, and (2) the amount of oxygen present in the outage of the container when the peanut butter is packed. Thus, it is essential not only that the dissolved, adsorbed, and entrained oxygen content of the peanut butter be reduced to at least 0.5 volume percent on the basis of the peanut butter measured at standard temperature and pressure, but it is also essential that the peanut butter be packed in an atmosphere whose oxygen content is insufficient to raise the total dissolved, adsorbed, entrained, and accessible oxygen level above about 0.5 volume percent on the basis of the peanut butter. This can be accomplished by canning or packing the peanut butter by conventional gas-canning means under an inert gas blanket or in a vacuum. It is preferred that the peanut butter be packed under a nitrogen or other inert gas blanket containing less than about one volume percent of oxygen on the basis of the outage and preferably about 0.5 volume percent of oxygen. Methods of canning or packing under a nitrogen or other inert gas blanket are well known and any such conventional gas packing method may be employed. Such packing is accomplished at positive or negative pressures in the container not in excess of pressures which will damage or break the container.

What is claimed is:

1. A process for improving the flavor stability of peanut butter by removing dissolved, adsorbed, and entrained oxygen therefrom by the steps comprising (a) injecting inert gas into a peanut butter slurry at a rate ranging from about six to about 30 volume percent of the rate the slurry is being pumped in the process system at the point of injection and while said slurry is maintained in a process system under a positive pressure of at least about three atmospheres, (b) retaining the inert gas in said process system for a period of time sufficient for substantially dissolving the inert gas in the slurry, (c) subsequent to the solution of said inert gas, flashing the slurry to substantially atmospheric pressure whereby an oxygen-inert gas mixture is released from solution in said slurry, (d) removing said released oxygen-inert gas mixture from said system, (e) rapidly chilling said slurry to a temperature less than about 100° F. to substantially crystallize the glyceride solids in said slurry, and (f) packing the crystallized peanut butter in a substantially oxygen-free atmosphere, said steps (a) through (d) being carried out a plurality of times such that the peanut butter contains not more than about 0.5 volume percent of dissolved, adsorbed, entrained and accessible oxygen when measured within 15 minutes after packing.

2. The process of claim 1 in which the positive pressure on the slurry is from about five to about seven atmospheres.

3. The process of claim 1 in which the inert gas is nitrogen.

4. A process of making essentially oxygen-free peanut butter having improved flavor stability comprising (1) removing dissolved, adsorbed, and entrained oxygen from a peanut butter stabilizer slurry consisting essentially of edible oil and up to about 65% by weight of the slurry of undissolved material by the steps comprising (a) injecting inert gas into said stabilizer slurry at a rate ranging from about six to about 30 volume percent of the rate the slurry is being pumped in the process system at the point of injection and while said slurry is maintained in a process system under a positive pressure of at least about three atmospheres, and (b) retaining the inert gas in said process system for a period of time sufficient for substantially dissolving the inert gas in the slurry, (c) subsequent to the solution of said inert gas, flashing the slurry to substantially atmospheric pressure whereby an oxygen-inert gas mixture is released from solution in said slurry, and (d) removing said released oxygen-inert gas mixture from said system; (2) admixing said de-oxygenated stabilizer slurry with a ground peanut mass to form a peanut butter slurry; and (3) removing dissolved and entrained oxygen from said peanut butter slurry by the steps comprising (e) injecting inert gas into said peanut butter slurry at a rate ranging from about six to about 30 volume percent of the rate the slurry is being pumped in the process system at the point of injection and while said slurry is maintained in a process system under a positive pressure of at least about three atmospheres, (f) retaining the inert gas in said process system for a period of time sufficient for substantially dissolving the inert gas in the slurry, (g) subsequent to the solution of said inert gas, flashing the slurry to substantially atmospheric pressure whereby an oxygen-inert gas mixture is released from solution in said slurry, (h) removing said released oxygen-inert gas mixture from said system, (i) rapidly chilling said slurry to a temperature less than about 100° F. to substantially crystallize the glyceride solids of said slurry, and (j) packing the crystallized peanut butter in a substantially oxygen-free atmosphere, said steps (e) through (h) being carried out a plurality of times such that the peanut butter contains not more than about 0.5 volume percent of dissolved, adsorbed, entrained and accessible oxygen when measured within 15 minutes after packing.

5. The process of claim 4 in which the positive pressure on the slurry is from about five to about seven atmospheres.

6. The process of claim 4 in which the inert gas is nitrogen.

References Cited by the Examiner

UNITED STATES PATENTS

| | | | |
|---|---|---|---|
| 1,649,127 | 11/1927 | Rector | 99—189 X |
| 2,521,243 | 9/1950 | Mitchell | 99—128 |

OTHER REFERENCES

Freeman et al., "Peanut Butter," March 1954, AIC-370, USDA Agriculture Research Service, Southern Utilization Branch, p. 7.

"Food Industries," September 1949, pp. 37, 38, 190, 192.

"Food Technology," April 1950, pp. 151, 156, 157.

References Cited by the Applicant

UNITED STATES PATENTS

| | | |
|---|---|---|
| 2,136,744 | 11/1938 | Hickman. |
| 2,494,717 | 1/1950 | Owen. |
| 2,834,682 | 5/1958 | Zuckerman. |
| 2,970,917 | 2/1961 | Melnick. |
| 2,976,154 | 3/1961 | Brown et al. |

OTHER REFERENCES

Procter & Gamble, Technical Bulletin on "Fix, the New Revolutionary Peanut Butter Stabilizer," p. 9 (1950).

A. LOUIS MONACELL, *Primary Examiner.*

JOSEPH M. GOLIAN, *Examiner.*